US012620058B2

(12) United States Patent
Laroche et al.

(10) Patent No.: US 12,620,058 B2
(45) Date of Patent: May 5, 2026

(54) SYSTEMS, APPARATUS, AND METHODS FOR SUPER-RESOLUTION OF NON-UNIFORM BLUR

(71) Applicant: GoPro, Inc., San Mateo, CA (US)

(72) Inventors: Charles Laroche, Paris (FR); Matias Tassano Ferres, Zurich (CH); Andrés Almansa, Paris (FR)

(73) Assignee: GoPro, Inc., San Mateo, CA (US)

( * ) Notice: Subject to any disclaimer, the term of this patent is extended or adjusted under 35 U.S.C. 154(b) by 424 days.

(21) Appl. No.: 18/179,730

(22) Filed: Mar. 7, 2023

(65) Prior Publication Data

US 2023/0281756 A1 Sep. 7, 2023

Related U.S. Application Data

(60) Provisional application No. 63/268,927, filed on Mar. 7, 2022.

(51) Int. Cl.
*G06T 3/4076* (2024.01)
*G06T 3/4046* (2024.01)
*G06T 5/70* (2024.01)

(52) U.S. Cl.
CPC .......... *G06T 3/4076* (2013.01); *G06T 3/4046* (2013.01); *G06T 5/70* (2024.01)

(58) Field of Classification Search
CPC ....... G06T 3/4076; G06T 3/4046; G06T 5/70; G06T 5/60; G06T 5/73; G06T 2207/10016; G06T 2207/20081; G06T 2207/20084; G06T 2207/30221; G06T 2207/30252; G06T 5/50
See application file for complete search history.

(56) References Cited

U.S. PATENT DOCUMENTS

| | | | | |
|---|---|---|---|---|
| 2020/0265555 A1* | 8/2020 | Elgendy | ................... | G06T 3/18 |
| 2021/0233210 A1* | 7/2021 | Elron | ................... | G06T 3/4046 |
| 2021/0241428 A1* | 8/2021 | Mansour | ................. | G06T 5/73 |
| 2022/0122223 A1* | 4/2022 | Choi | ......................... | G06T 5/70 |

OTHER PUBLICATIONS

Kawar, B., Vaksman, G., & Elad, M. (2021). Snips: Solving noisy inverse problems stochastically. Advances in Neural Information Processing Systems, 34, 21757-21769. (Year: 2021).*

(Continued)

*Primary Examiner* — Gregory A Morse
*Assistant Examiner* — Renae A Bitor
(74) *Attorney, Agent, or Firm* — Wang Hardoon, P.C.

(57) ABSTRACT

Systems, apparatus, and methods for super-resolution of non-uniform spatial blur. Non-uniform spatial blur presents unique challenges for conventional neural network processing. Existing implementations attempt to handle super-resolution with a "brute force" optimization. Various embodiments of the present disclosure subdivide the super-resolution function into sub-steps. "Unfolding" super-resolution into smaller closed-form functions allows for operation using generic plug-and-play convolutional neural network (CNN) logic. Additionally, each step can be optimized with its own step-specific hyper parameters to improve performance.

20 Claims, 6 Drawing Sheets

(56) References Cited

OTHER PUBLICATIONS

Unni, V. S., Ghosh, S., & Chaudhury, K. N. (Nov. 2018). Linearized ADMM and fast nonlocal denoising for efficient plug-and-play restoration. In 2018 IEEE Global Conference on Signal and Information Processing (GlobalSIP) (pp. 11-15). IEEE. (Year: 2018).*

Singanallur V. Venkatakrishnan, Charles A. Bouman, and Brendt Wohlberg. Plug-and-play priors for model based reconstruction. IEEE Global Conference on Signal and Information Processing, 2013.

Stanley H. Chan, Xiran Wang, and Omar A. Elgendy. Plug-and-play admm for image restoration: Fixed-point convergence and applications. IEEE Transactions on Computational Imaging, 2017.

Stephen Boyd, Neal Parikh, Eric Chu, Borja Peleato, and Jonathan Eckstein. Distributed Optimization and Statistical Learning via the Alternating Direction Method of Multipliers. Foundations and Trends® in Machine Learning, 3(1):1-122, 2010.

Syed Waqas Zamir, Aditya Arora, Salman Khan, Munawar Hayat, Fahad Shahbaz Khan, Ming-Hsuan Yang, and Ling Shao. Multistage progressive image restoration. In CVPR, 2021.

Thomas Eboli, Jian Sun, and Jean Ponce. End-to-end interpretable learning of non-blind image deblurring. In ECCV, 2020.

Tim Meinhardt, Michael Moeller, Caner Hazirbas, and Daniel Cremers. Learning Proximal Operators: Using Denoising Networks for Regularizing Inverse Imaging Problems. In (ICCV) International Conference on Computer Vision, pp. 1799-1808. IEEE, Oct. 2017.

Tom Tirer and Raja Giryes. Image restoration by iterative denoising and backward projections. IEEE Transactions on Image Processing, 2019.

Tomer Michaeli and Michal Irani. Nonparametric Blind Super-resolution. In (ICCV) International Conference on Computer Vision, pp. 945-952. IEEE, Dec. 2013.

Tsung-Yi Lin, Michael Maire, Serge Belongie, Lubomir Bourdev, Ross Girshick, James Hays, Pietro Perona, Deva Ramanan, C. Lawrence Zitnick, and Pi-otr Dolla'r. Microsoft COCO: Common Objects in Context. In (ECCV) European Conference on Computer Vision, 2015.

Ulugbek S. Kamilov, Hassan Mansour, and Brendt Wohlberg. A plug-and-play priors approach for solving nonlinear imaging inverse problems. IEEE Signal Processing Letters, 2017.

Victor Cornillère, Abdelaziz Djelouah, Wang Yifan, Olga Sorkine-Hornung, and Christopher Schroers. Blind image super-resolution with spatially variant degradations. In ACM Transactions on Graphics, 2019.

Wang Xintao, Yu Ke, Wu Shixiang, Gu Jinjin, Liu Yihao, Dong Chao, Qiao Yu, and Loy Chen Change. Esrgan: Enhanced super-resolution generative adversarial networks. In The European Conference on Computer Vision Workshops (ECCVW), Sep. 2018. 16 pages.

Wei-Sheng Lai, Jia-Bin Huang, Zhe Hu, Narendra Ahuja, and Ming-Hsuan Yang. A comparative study for single image blind deblurring. In IEEE Conferene on Computer Vision and Pattern Recognition, 2016.

Xiang Zhu, Scott Cohen, Stephen Schiller, and Pey-man Milanfar. Estimating spatially varying defocus blur from a single image. IEEE Transactions on Image Processing, 22(12):4879-4891, 2013.

Xiaoqun Zhang, Martin Burger, and Stanley Osher. A unified primal-dual algorithm framework based on bregman iteration. In Journal of Scientific Computing, 2011.

Xin Tao, Hongyun Gao, Xiaoyong Shen, Jue Wang, and Jiaya Jia. Scale-recurrent network for deep image deblurring. In 2018 IEEE/CVF Conference on Computer Vision and Pattern Recognition, pp. 8174-8182, 2018.

Xintao Wang, Ke Yu, Chao Dong, and Chen Change Loy. Recovering realistic texture in image super-resolution by deep spatial feature transform. In 2018 IEEE/CVF Conference on Computer Vision and Pattern Recognition, pp. 606-615, 2018.

Xiran Wang and Stanley H. Chan. Parameter-free plug-and-play admm for image restoration. In 2017 IEEE International Conference on Acoustics, Speech and Signal Processing (ICASSP), 2017.

Yaniv Romano, John Isidoro, and Peyman Milanfar. RAISR: Rapid and Accurate Image Super Resolution. IEEE Transactions on Computational Imaging, 3(1):110-125, Jun. 2016.

Yehuda Dar, Alfred M. Bruckstein, Michael Elad, and Raja Giryes. Postprocessing of compressed images via sequential denoising. IEEE Transactions on Image Processing, 2016.

Ying Tai, Jian Yang, Xiaoming Liu, and Chunyan Xu. Memnet: A persistent memory network for image restoration. In 2017 IEEE International Conference on Computer Vision (ICCV), pp. 4549-4557, 2017.

Ze Liu, Yutong Lin, Yue Cao, Han Hu, Yixuan Wei, Zheng Zhang, Stephen Lin, and Baining Guo. Swin transformer: Hierarchical vision transformer using shifted windows. In International Conference on Computer Vision (ICCV), 2021.

Zhang Yulun, Li Kunpeng, Li Kai, Wang Lichen, Zhong Bineng, and Fu Yun. Image superresolution using very deep residual channel attention networks. In ECCV, 2018. 16 pages.

Zhouchen Lin, Risheng Liu, and Zhixun Su. Linearized alternating direction method with adaptive penalty for low-rank representation. In Advances in Neural Information Processing Systems. Curran Associates, Inc., 2011.

Alon Brifman, Yaniv Romano, and Michael Elad. Turning a denoiser into a super-resolver using plug and play priors. In 2016 IEEE International Conference on Image Processing (ICIP), 2016.

Anat Levin, Yair Weiss, Fredo Durand, and William T. Freeman. Understanding and evaluating blind de-convolution algorithms. In 2009 IEEE Conference on Computer Vision and Pattern Recognition, pp. 1964-1971, 2009.

Andres Almansa, Sylvain Durand, and Bernard Rouge. Measuring and Improving Image Resolution by Adaptation of the Reciprocal Cell. Journal of Mathematical Imaging and Vision, 21(3):235-279, Nov. 2004.

Assaf Shocher, Nadav Cohen, and Michal Irani. Zero-shot super-resolution using deep internal learning. In 2018 IEEE/CVF Conference on Computer Vision and Pattern Recognition, pp. 3118-3126, 2018.

Bee Lim, Sanghyun Son, Heewon Kim, Seungjun Nah, and Kyoung Mu Lee. Enhanced deep residual networks for single image super-resolution. In 2017 IEEE Conference on Computer Vision and Pattern Recognition Workshops (CVPRW), pp. 1132-1140, 2017.

Chao Dong, Chen Change Loy, Kaiming He, and Xiaoou Tang. Learning a deep convolutional network for image super-resolution. In David Fleet, Tomas Pajdla, Bernt Schiele, and Tinne Tuytelaars, editors, Proceedings of European Conference on Computer Vision (ECCV), pp. 184-199. Springer International Publishing, 2014.

Chitwan Saharia, Jonathan Ho, William Chan, Tim Salimans, David J. Fleet, and Mohammad Norouzi. Image Super- Resolution via Iterative Refinement. arXiv:2104.07636, 2021.

Christian J. Schuler, Michael Hirsch, Stefan Harmeling, and Bernhard Scholkopf. Learning to deblur. IEEE Transactions on Pattern Analysis and Machine Intelligence, 38(7):1439-1451, 2016. Abstract.

Delbracio et al. The Non-parametric Sub-pixel Local Point Spread Function Estimation Is a Well Posed Problem. IJCV, Jan. 2012.

Dilip Krishnan and Rob Fergus. Fast image deconvolution using hyper-laplacian priors. In Y. Bengio, D. Schuurmans, J. Lafferty, C. Williams, and A. Culotta, editors, Advances in Neural Information Processing Systems, vol. 22. Curran Associates, Inc., 2009.

Ernest Ryu, Jialin Liu, Sicheng Wang, Xiaohan Chen, Zhangyang Wang, and Wotao Yin. Plug-and-play methods provably converge with properly trained denoisers. In Kamalika Chaudhuri and Ruslan Salakhut-dinov, editors, Proceedings of the 36th International Conference on Machine Learning, vol. 97 of Proceedings of Machine Learning Research, pp. 5546-5557, Long Beach, California, USA, Jun. 9-15, 2019. PMLR. Abstract.

Ernie Esser, Xiaoqun Zhang, and Tony F. Chan. A general framework for a class of first order primal-dual algorithms for convex optimization in imaging science. In Society for Industrial and Applied Mathematics (SIAM), 2010. Abstract.

(56) References Cited

OTHER PUBLICATIONS

F Malgouyres and F Guichard. Edge Direction Preserving Image Zooming: A Mathematical and Numerical Analysis. SIAM Journal on Numerical Analysis, 39(1):1-37, Jan. 2001.

Fabien Gavant, Laurent Alacoque, Antoine Dupret, and Dominique David. A physiological camera shake model for image stabilization systems. In SENSORS, 2011 IEEE, pp. 1461-1464, 2011. Abstract.

Felix Heide, Markus Steinberger, Yun-Ta Tsai, Mushfiqur Rouf, Dawid Pajak, Dikpal Reddy, Orazio Gallo, Jing Liu, Wolfgang Heidrich, Karen Egiazarian, Jan Kautz, and Kari Pulli. FlexISP: A Flexible Camera Image Processing Framework. ACM Transactions on Graphics, 33, 2014. Abstract.

Foivos I. Diakogiannis, François Waldner, Peter Cac-cetta, and Chen Wu. Resunet-a: A deep learning framework for semantic segmentation of remotely sensed data. ISPRS Journal of Photogrammetry and Remote Sensing, 162:94-114, 2020.

Gregery T. Buzzard, Stanley H. Chan, Suhas Sreehari, and Charles A. Bouman. Plug-and-play unplugged: Optimization-free reconstruction using consensus equilibrium. SIAM Journal on Imaging Sciences, 2018.

Guillermo Carbajal, Patricia Vitoria, Mauricio Delbracio, Pablo Muse', and Jose'Lezama. Non-uniform blur kernel estimation via adaptive basis decomposition. arXiv:2102.01026, 2021.

Hirsch Michael, Sra Suvrit, Scholkopf Bernhard, and Harmeling Stefan. Efficient filter flow for space-variant multiframe blind deconvolution. In IEEE Computer Society Conference on Computer Vision and Pattern Recognition, 2010.

Hongguang Zhang, Yuchao Dai, Hongdong Li, and Piotr Koniusz. Deep stacked hierarchical multi-patch network for image deblurring. In The IEEE Conference on Computer Vision and Pattern Recognition (CVPR), Jun. 2019.

Hua Ouyang, Niao He, and Alexander Gray. Stochastic ADMM for Nonsmooth Optimization. arXiv:1211.0632, Nov. 2012.

Ikoma et al. Depth from defocus with learned optics for imaging and occlusion-aware depth estimation. ICCP, 2021.

Jingyun Liang, Guolei Sun, Kai Zhang, Luc Van Gool, and Radu Timofte. Mutual affine network for spa-tially variant kernel estimation in blind image super-resolution. In IEEE International Conference on Computer Vision (ICCV), 2021.

Jingyun Liang, Jiezhang Cao, Guolei Sun, Kai Zhang, Luc Van Gool, and Radu Timofte. Swinir: Image restoration using swin transformer. In 2021 IEEE/CVF International Conference on Computer Vision Workshops (ICCVW), pp. 1833-1844, 2021.

Jinjin Gu, Hannan Lu, Wangmeng Zuo, and Chao Dong. Blind super-resolution with iterative kernel correction. In 2019 IEEE/CVF Conference on Computer Vision and Pattern Recognition (CVPR), pp. 1604-1613, 2019.

Jiwon Kim, Jung Kwon Lee, and Kyoung Mu Lee. Accurate image super-resolution using very deep convolutional networks. In 2016 IEEE Conference on Computer Vision and Pattern Recognition (CVPR), pp. 1646-1654, 2016.

Jiwon Kim, Jung Kwon Lee, and Kyoung Mu Lee. Deeply-recursive convolutional network for image super-resolution. In 2016 IEEE Conference on Computer Vision and Pattern Recognition (CVPR), pp. 1637-1645, 2016.

Kai Zhang, Jingyun Liang, Luc Van Gool, and Radu Timofte. Designing a practical degradation model for deep blind image super-resolution. In IEEE International Conference on Computer Vision, pp. 4791-4800, 2021.

Kai Zhang, Luc Van Gool, and Radu Timofte. Deep unfolding network for image super-resolution. In 2020 IEEE/CVF Conference on Computer Vision and Pattern Recognition (CVPR), pp. 3214-3223, 2020.

Kai Zhang, Wangmeng Zuo, and Lei Zhang. Learning a single convolutional super-resolution network for multiple degradations. In 2018 IEEE/CVF Conference on Computer Vision and Pattern Recognition, pp. 3262-3271, 2018.

Kai Zhang, Yawei Li, Wangmeng Zuo, Lei Zhang, Luc Van Gool, and Radu Timofte. Plug-and-play image restoration with deep denoiser prior. IEEE Transactions on Pattern Analysis and Machine Intelligence, 2021.

Laroche, Charles, Andrés Almansa, and Matias Tassano. "Deep Model-Based Super-Resolution with Non-uniform Blur." Proceedings of the IEEE/CVF Winter Conference on Applications of Computer Vision. 2023.

Laurent D'Andrès, Jordi Salvador, Axel Kochale, and Sabine Susstrunk. Non-parametric blur map regression for depth of field extension. IEEE Transactions on Image Processing, 25(4):1660-1673, 2016.

Leonid I. Rudin, Stanley Osher, and Emad Fatemi. Nonlinear total variation based noise removal algorithms. Physica D: Nonlinear Phenomena, 60(1):259-268, 1992.

Matan Protter, Michael Elad, Hiroyuki Takeda, and Peyman Milanfar. Generalizing the nonlocal-means to super- resolution reconstruction. In IEEE Transactions on Image Processing, vol. 18, pp. 36-51, Jan. 2009.

Michaeli et al., "Blind Deblurring Using Internal Patch Recurrence", D. Fleet et al. (Eds.): ECCV 2014, Part III, LNCS 8691, pp. 783-798, 2014.

Michal Sorel, Filip Sroubek, and Jan Flusser. Towards Super-Resolution in the Presence of Spatially Varying Blur. In Super-Resolution Imaging, chapter 7, pp. 187-218. CRC Press, Dec. 2017.

Mohammad Emad, Maurice Peemen, and Henk Cor-poraal. DualSR: Zero-Shot Dual Learning for Real-World Super-Resolution. In 2021 IEEE Winter Conference on Applications of Computer Vision (WACV), pp. 1629-1638, 2021.

Nagy, James G., and Dianne P. O'Leary. "Restoring images degraded by spatially variant blur." SIAM Journal on Scientific Computing 19.4 (1998): 1063-1082.

Neal Parikh and Stephen Boyd. Proximal Algorithms. Foundations and Trends® in Optimization, 1(3):127-239, 2014.

Ningning Zhao, Qi Wei, Adrian Basarab, Nicolas Dobigeon, Denis Kouamé, and Jean-Yves Tourneret. Fast Single Image Super-Resolution Using a New Analytical Solution for 12-12 Problems. IEEE Transactions on Image Processing, vol. 25(n° 8):pp. 3683-3697, Aug. 2016.

Oliver Whyte, Josef Sivic, Andrew Zisserman, and Jean Ponce. Non-uniform deblurring for shaken images. In 2010 IEEE Computer Society Conference on Computer Vision and Pattern Recognition, pp. 491-498, 2010.

Paul Escande and Pierre Weiss. Accelerating 11-12 deblurring using wavelet expansions of operators. Journal of Computational and Applied Mathematics, 343:373-396, Dec. 2018.

Paul Escande, Pierre Weiss, and François Malgo-uyres. Image restoration using sparse approximations of spatially varying blur operators in the wavelet domain. Journal of Physics: Conference Series, 464(1):012004, Oct. 2013.

Paul Escande, Pierre Weiss, and François Malgouyres. Spatially varying blur recovery. diagonal approximations in the wavelet domain. ICPRAM, 2013.

Peyman Milanfar, editor. Super-Resolution Imaging. CRC Press, Dec. 2011.

Qinghua Liu, Xinyue Shen, and Yuantao Gu. Linearized ADMM for Nonconvex Nonsmooth Optimization With Convergence Analysis. IEEE Access, 7:76131-76144, 2019.

Remi Gribonval. Should penalized least squares regression be interpreted as maximum a posteriori estimation? IEEE Transactions on Signal Processing, 59(5):2405-2410, 2011. Absract.

Rémi Laumont, Valentin de Bortoli, Andrés Almansa, Julie Delon, Alain Durmus, and Marcelo Pereyra. On Maximum- a-Posteriori estimation with Plug & Play priors and stochastic gradient descent. Technical report, MAP5, Jan. 2022.

Sefi Bell-Kligler, Assaf Shocher, and Michal Irani. Blind super-resolution kernel estimation using an internal-gan. In NeurIPS, 2019.

* cited by examiner

200

304 306 308

302 310

SYSTEMS, APPARATUS, AND METHODS FOR SUPER-RESOLUTION OF NON-UNIFORM BLUR

PRIORITY

This application claims the benefit of priority to U.S. Provisional Patent Application No. 63/268,927 entitled "SYSTEMS, APPARATUS, AND METHODS FOR SUPER-RESOLUTION OF NON-UNIFORM SPATIAL BLUR" filed Mar. 7, 2022, the contents of which are incorporated herein by reference in its entirety.

COPYRIGHT

TECHNICAL FIELD

This disclosure relates generally to the field of image processing. More particularly, the present disclosure relates to systems, computer programs, devices, and methods for generating super-resolution images.

DESCRIPTION OF RELATED TECHNOLOGY

Single image super-resolution (SISR) techniques attempt to create a high-resolution version (HR) of a low-resolution image (LR). A HR image that is directly scaled up from the LR image will be perceived by a human observer as being a blurry or noisy HR image; notably, super-resolution techniques cannot increase the amount of image information after capture. Instead, the goal of super-resolution post-processing is to create a subjectively acceptable HR facsimile.

Conventional super-resolution techniques have been based on arithmetic interpolation/extrapolation (e.g., Tykhonov, Total Variation (TV), etc.). Unfortunately, these techniques often introduce undesirable artifacts that may be visually jarring to humans. More recently, however, simple neural network implementations have shown great promise for super-resolution applications. The hope is that future advancements in neural network processing can provide even better super-resolution capabilities.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Conventional Super-Resolution Techniques and Machine Learning

Figure 5:
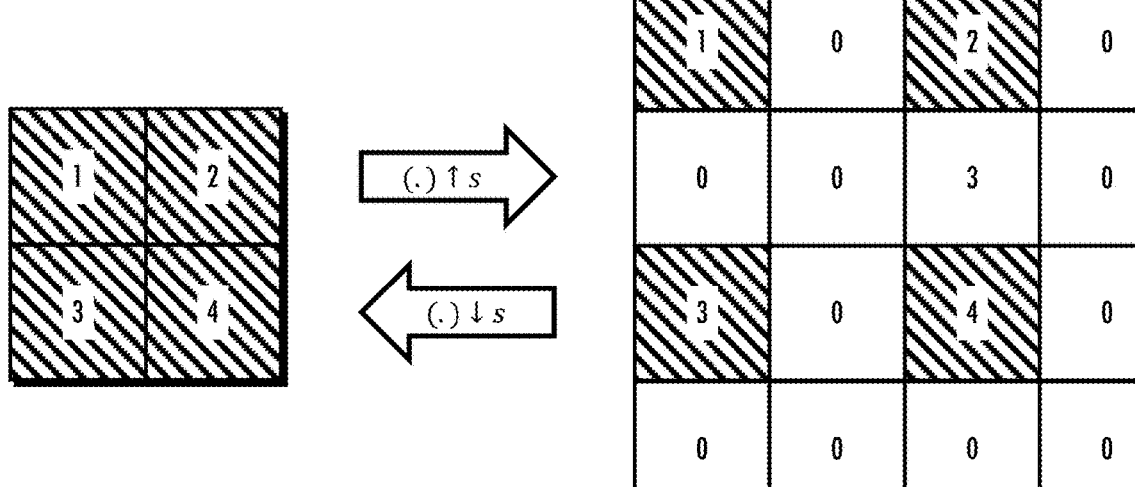
FIG. 5 illustrates down-sampling and up-sampling operators for super resolution, useful to illustrate various aspects of the present disclosure.

Single image super-resolution (SISR) methods aim to up-sample a blurred, noisy and possibly aliased low-resolution (LR) image into a high-resolution (HR) one. In other words, the goal of SISR is to enlarge an image by a given scale factor s>1 in a way that makes fine details more clearly visible. Typically, an image or a portion of an image may be upscaled to a multiple of its current resolution using SISR methods. For example, a 100×100 image may be upscaled by a scale factor of 2 (s=2) to be a 200×200 image. A kernel-based technique to upscale an image involves adding (one or more) rows and columns of zero value pixels between existing pixels in an image (as illustrated in FIG. 5) and duplicating pixels or convolving the image with a filter to interpolate pixels.

Figure 1:
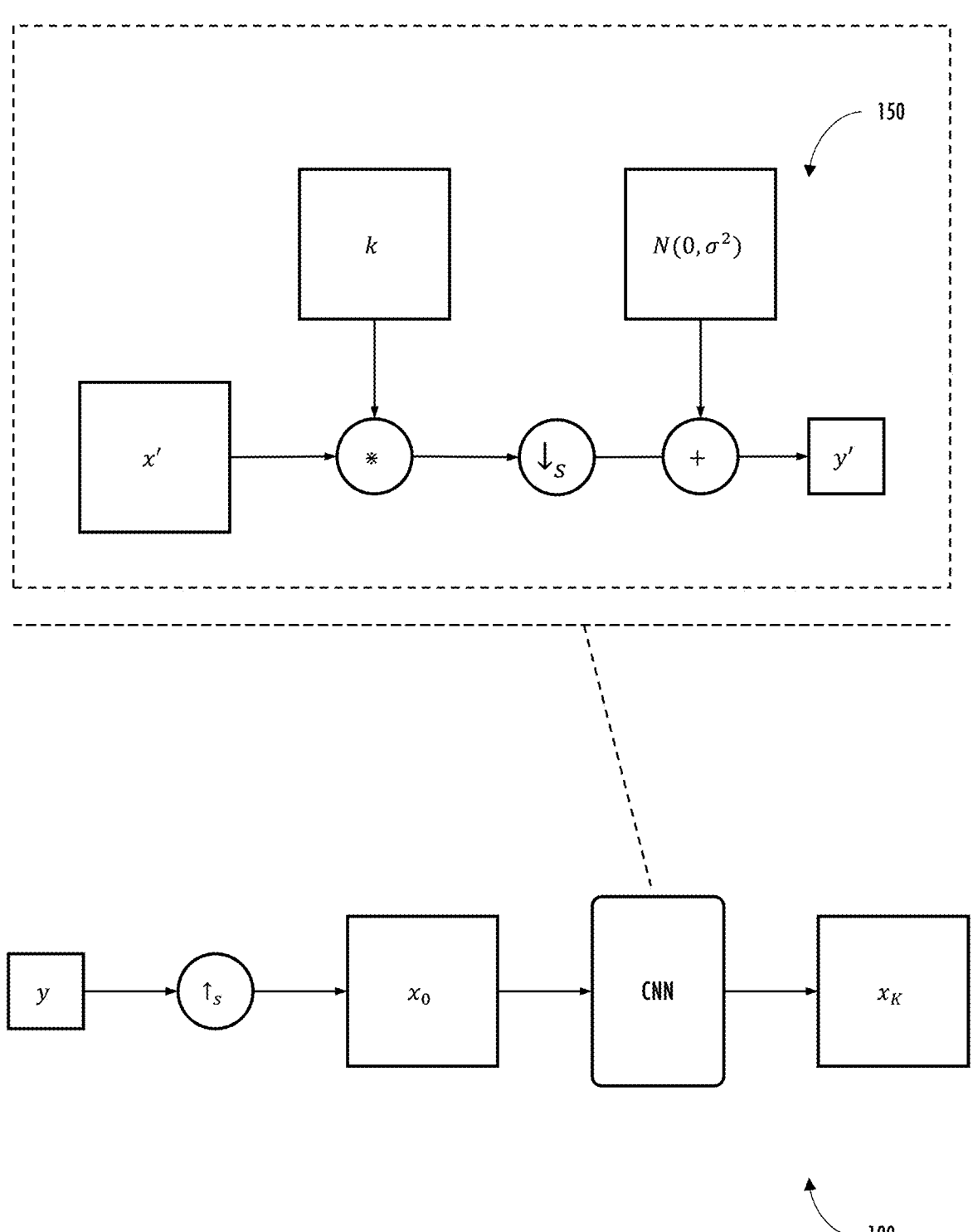
FIG. 1 is a logical flow diagram of a conventional approach to training a convolutional neural network (CNN) for super-resolution, useful to illustrate various aspects of the present disclosure.

FIG. 1 illustrates a conventional approach to training a convolutional neural network (CNN) 100 for super-resolution, useful to illustrate various aspects of the present disclosure. As shown, the SISR method assumes that the low-resolution image is a blurry, noisy and down-sampled version of a high-resolution image characterized by the equation:

$$y=(x*k)\downarrow_s+\epsilon; \text{ where } \epsilon \sim \mathcal{N}(0,\sigma^2) \qquad \text{EQN. 1:}$$

Where x is the high-resolution image, y is the low-resolution image, k is the blur kernel, $\downarrow_s$ is the down-sampling operator with a scaling factor (s); and $\epsilon$ is the noise. Notably, this formulation assumes that the blur kernel (k) is uniform over the entire image space (e.g., spatially uniform).

The closed-form simplicity of the foregoing approach enables straightforward neural network training with known input and output data. As used herein, the term "closed-form" refers to a mathematical expression that can be described with a finite number of operations. For example, a library of input images can be convolved with the blur kernel (or analogously, multiplied in Fourier space), down-sampled by 2 in both rows and columns, and dithered with noise, to generate a low-resolution training output (training data generation process 150). The library of training pairs (high-resolution images x' and low-resolution images y') may be used to train the CNN. Using known image data also provides quantitative metrics, e.g., a minimum mean squared error (MMSE) can be calculated between the original HR and the recreated HR image to evaluate the CNN's performance. The ease and simplicity of CNN-based denoising for spatially uniform blur is well known and commonly available as so-called "plug-and-play" functionality within commodity neural network cores and/or software (circa 2022).

As a brief aside, action cameras are typically designed to capture immersive footage (e.g., live action under a variety of non-stage scenarios). For a variety of reasons, action cameras are typically compact, ruggedized, and designed to require minimal interaction once recording has begun. In most situations, the action camera user cannot control shooting conditions—interesting moments can fleetingly occur and often cannot be replicated. As a result, content generated by action cameras often require significant editing; e.g., raw footage may be incorrectly pointed (e.g., the subject of interest may be outside the designated view) and shots may need to be re-stabilized (e.g., to account for large unexpected movements, etc.).

Additionally, in many cases, the action camera and/or the subject of interest may be moving relative to one another; as a practical result, action camera footage may include motion blurs that are entirely arbitrary e.g., stable objects may have blur imparted by the camera's motion, moving objects may be appear stable relative to the camera, etc. More directly, arbitrary motion blur in action camera footage presents unique challenges for existing neural network approaches. First, the arbitrary nature of motion blur in practical capture scenarios has not been studied, so there is no common library of training data. As a result, plug-and-play CNN modules are not currently (or likely ever will be) pre-trained for such applications. Additionally, the non-uniform nature of motion blur cannot be represented in closed-form. In other words, a training library cannot be calculated from existing "still" libraries, nor can the CNN's performance be quantified. In a related tangent, neural network processing enables highly parallelized processing by design. Most neural network implementations handle processing complexity as a function of nodes; i.e., more complex processing tasks require more nodes. Unfortunately, brute force scaling of existing neural network implementations will require exponentially more resources as node numerosity increases—this is particularly problematic for embedded applications which have limited on-device resources (power, memory, compute cycles, etc.)

Figure 2:
FIG. 2 illustrates an example frame 200 with non-uniform blur, useful to illustrate various aspects of the present disclosure.

Assuming that a blur kernel is uniform across the entire image is not always realistic since camera or object motion will often result in non-uniform/anisotropic blur. Non-uniform blur is characterized by a blur kernel that varies (is not uniform) across the entire image (or image segment). For example, FIG. 2 illustrates an example frame 200 with non-uniform blur, useful to illustrate various aspects of the present disclosure. In the example frame 200, background objects (e.g., plants and trees) are moving with respect to the camera, so they appear blurry, whereas foreground objects (e.g., the handlebars of the bicycle) are sharp. In another example, spatially varying blur can appear when the objects are out-of-focus. In this example, the blur is closely related to the depth-of-field. Unlike a uniformly applied blur (e.g., a Gaussian blur applied across an image), blurring due to depth-of-field is non-uniform as the amount of blurring varies (i.e., increases) with the objects distance from the focal plane. Non-uniform blurring due to depth-of-field is particularly apparent in macro-photo and microscopy where the effects of depth-of-field are pronounced. Non-uniform blurring may be multi-causal (e.g., from the combined effects of motion blur and depth-of-field/out-of-focus blur).

New techniques for super-resolution of non-uniform spatial blur are needed. Ideally, such solutions should be implemented within commodity neural network hardware and enable super resolution within embedded devices. Furthermore, new training techniques are needed to handle the unique nature of arbitrary non-uniform spatial blur, in particular, spatially varying and highly anisotropic blur kernels.

Example Operation

Instead of gathering real-world data with non-uniform spatial blur (and imperfect capture knowledge), various embodiments of the present disclosure synthesize training data; synthesis from known image data enables quantitative analysis and benchmarking of blur removal.

Historically, spatially variant blur could be removed by treating the captured image as a masked overlay of spatially uniform blurs; examples of such techniques include those discussed within *Restoring Images Degraded by Spatially Variant Blur*, to James G. Nagy and Dianne P. O'Leary, published July 1998, in Vol. 19, No. 4, pp. 1063-1082, in the Society for Industrial and Applied Mathematics (SIAM) Journal of Scientific Computing, incorporated by reference herein in its entirety. Within the context of the present disclosure, a modified technique may be used to synthesize spatially variant blur from pristine images.

In one exemplary embodiment, the training images are synthesized by a pixel-wise overlay of different blur operators, defined as follows:

$$H = \sum_{i=1}^{P} U_i H_i \qquad \text{EQN. 2}$$

Where each $H_i$ is a spatially-uniform blur that can be computed using Fourier Transforms, where each $U_i$ represents the influence of blur for each pixel location such that $$\sum_{i=1}^{P} U_i = Id, U_i \geq 0$$

(also referred to throughout as a point spread function (PSF)), and where P is the number of blur kernels and masks.

Training image synthesis can be used to create a library of non-uniform spatial blurs from existing libraries and their tags. For example, a segmentation image may be associated with a segmentation mask; the mask may be assigned an arbitrary blur kernel (e.g., handshake, camera motion, subject motion, and/or Gaussian); the combination of mask ($U_i$) and blur kernel ($H_i$) define a corresponding PSF. To ensure a smooth and realistic transition between the blurred areas (PSFs), the borders of the masks are mixed at edges (e.g., convolutional blending, etc.) Finally, each mask may be normalized so that the pixels have consistent magnitude. After summing the PSFs, the resulting image is down-sampled according to the desired scaling factor (s) and noise ($\in$).

Figure 3:
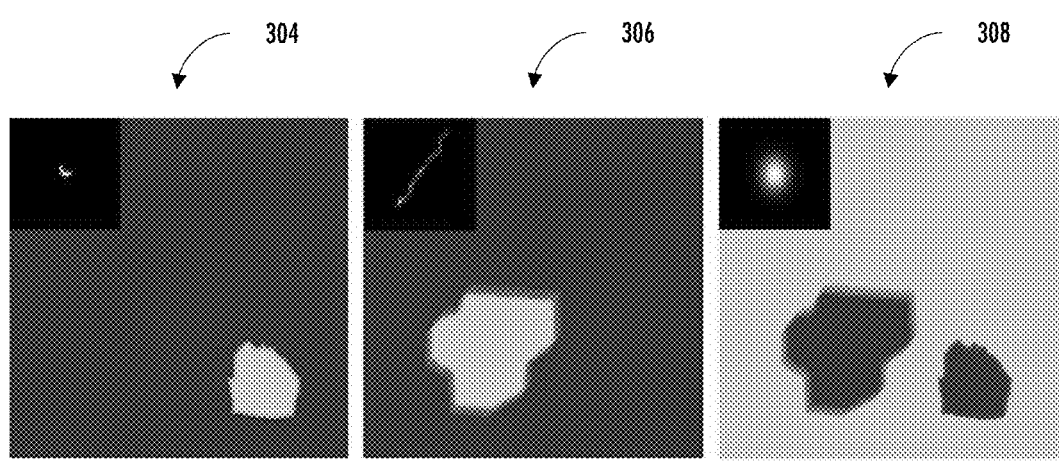
FIG. 3 provides a graphical representation of non-uniform spatially blurred test input images for use in evaluating different super-resolution techniques.
Figure 3:
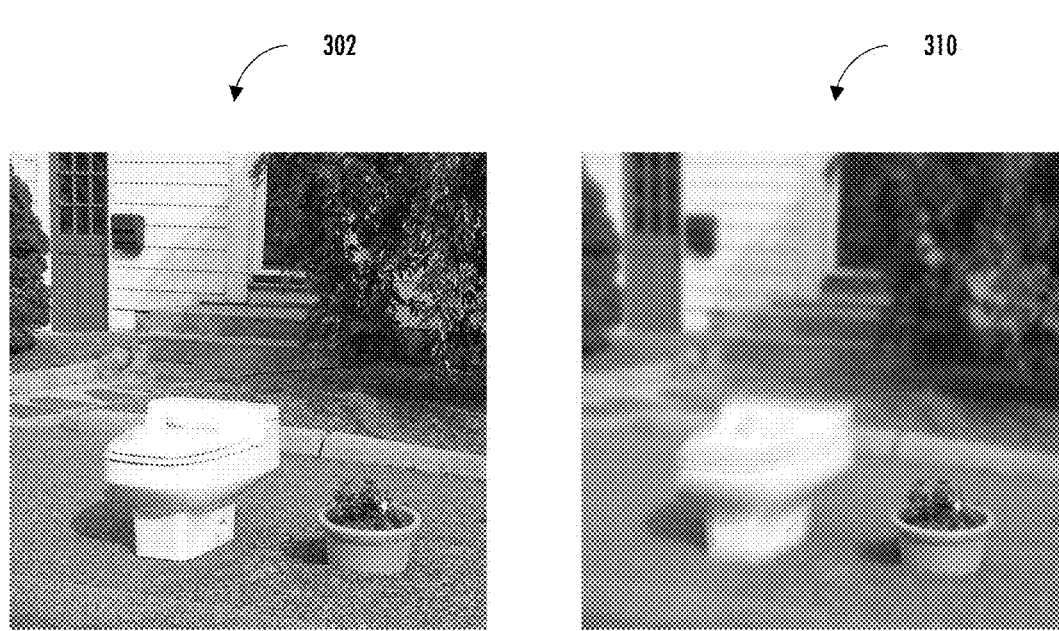

FIG. 3 depicts a non-uniform spatially blurred test input image for use in evaluating different super-resolution techniques. As shown, the segmentation image (pristine image 302) includes two segments (a plant and a toilet); each has been assigned a different handshake motion blur mask (mask 304, mask 306), and the background has a Gaussian blur (mask 308). The masks can be used to generate a synthetic image 310 with non-uniform spatial blur. More generally, a wide variety of blur effects (e.g., bokeh, defocus, etc.) may be handled as a summation of point spread functions (PSFs).

The resulting synthesized image data may be mathematically described as follows:

$$y = \left( \sum_{i=1}^{P} U_i H_i x \right) \downarrow_s + \in \qquad \text{EQN. 3}$$

Figure 4:
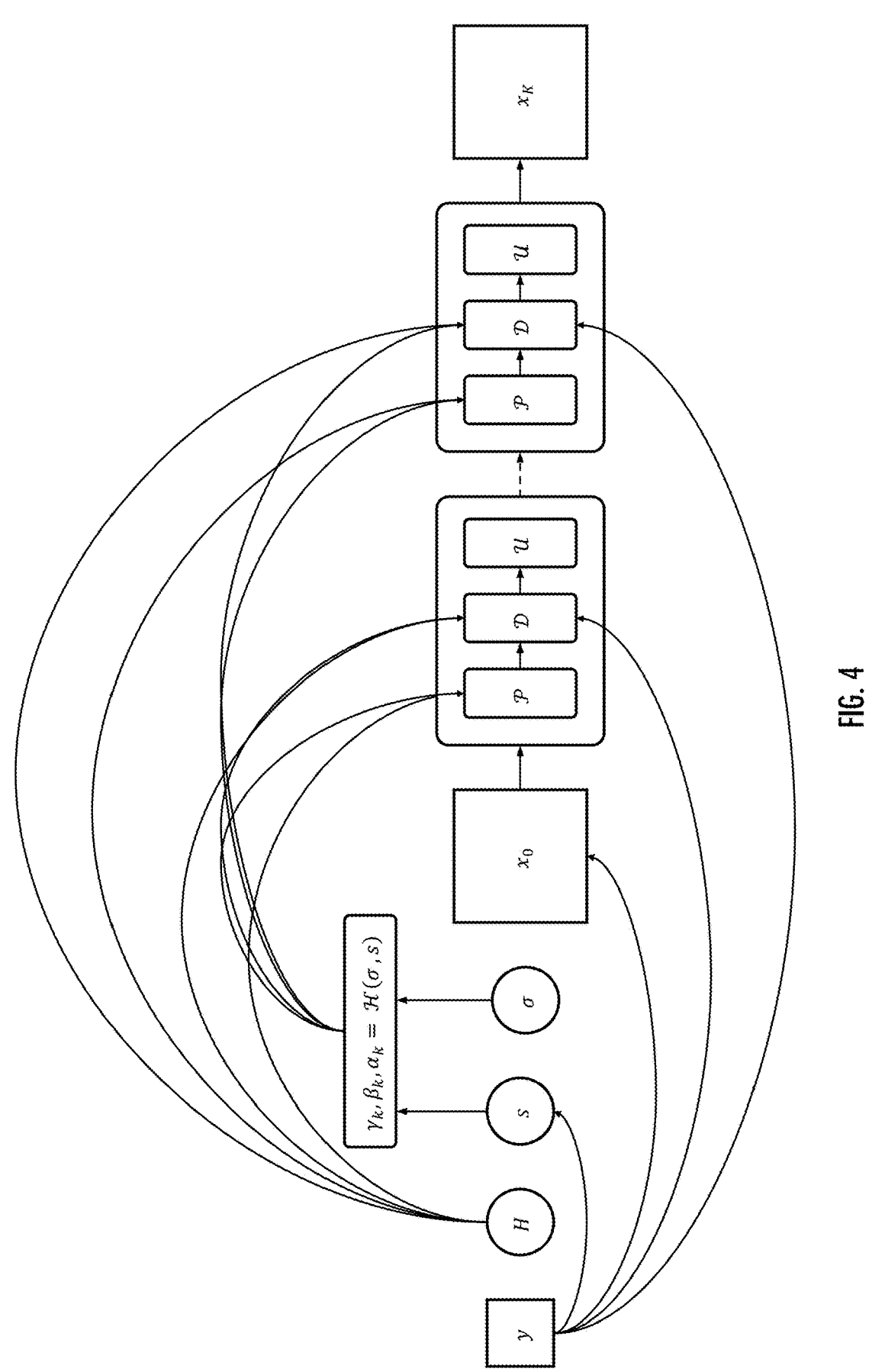
FIG. 4 is a logical flow diagram of an exemplary convolutional neural network (CNN) for super-resolution.

Referring now to FIG. 4, a logical flow diagram of an exemplary convolutional neural network (CNN) for super-resolution is presented. For reference, the exemplary CNN seeks to resolve images that have spatially non-uniform blur according to EQN. 4 (compared to EQN. 1, above):

$$Y = (X * H) \downarrow_s + \in; \text{where } \in \sim \mathcal{N}(0, \sigma^2) \qquad \text{EQN. 4}$$

Where Y and X are the linearized versions of the high-resolution image (x) and the low-resolution image (y), and H is the point-wise blur operator. More directly, unlike the EQN. 1 discussed above, this formulation allows for blur on a point-wise basis throughout the entire image space (e.g., spatially non-uniform). For Gaussian noise, the maximum a-posteriori (MAP) estimator of EQN. 4 may be reformulated as the following optimization problem:

$$x^* = \operatorname*{argmin}_x \frac{1}{2\sigma^2} \|(Hx) \downarrow_s - y\|_2^2 + \lambda\phi(x) \qquad \text{EQN. 5}$$

Where $\phi$ corresponds to a regularization function, and $\lambda$ is a trade-off parameter between the data term and the regularization term.

EQN. 5 is an optimization problem that may be solved by alternate minimization techniques; one such family of techniques is referred to as the so-called "alternating direction method of multipliers" (ADMM) techniques. This family of algorithms can solve convex optimization problems by breaking the optimization into smaller optimizations. In one specific implementation, a splitting variable z=Hx can be used to reformulate EQN. 5 into three (3) separate optimizations:

$$x_{k+1} = \operatorname*{argmin}_x \lambda\phi(x) + \frac{\mu}{2}\|x - (z_k - u_k)\|_2^2 \qquad \text{EQN. 6}$$

$$z_{k+1} = \operatorname*{argmin}_x \frac{1}{2\sigma^2}\|(Hz)\downarrow_s - y\|_2^2 + \frac{\mu}{2}\|z - (x_{k+1} - u_k)\|_2^2 \qquad \text{EQN. 7}$$

$$u_{k+1} = u_k + (x_{k+1} - z_{k+1}) \qquad \text{EQN. 8}$$

While brute force ADMM is intractable for embedded devices and/or real-time applications, a linearized ADMM variant may be used in such systems to provide similar results. In one specific implementation, the ADMM of EQN. 6-8 to can be simplified to a linearized ADMM described in EQN. 9-11:

$$x_{k+1} = \operatorname*{argmin}_x \lambda\phi(x) + \frac{\mu}{2}\left\|x - \left(x_k - (\rho\mu)H^T\left(H_{x_k} - z_k + u_k\right)\right)\right\|_2^2 \qquad \text{EQN. 9}$$

$$z_{k+1} = \operatorname*{argmin}_x \frac{1}{2\sigma^2}\|z - y\|_2^2 + \frac{\rho}{2}\|z - (Hx_{k+1} + u_k)\|_2^2 \qquad \text{EQN. 10}$$

$$u_{k+1} = u_k + Hx_{k+1} - z_{k+1} \qquad \text{EQN. 11}$$

From a Bayesian perspective, EQN. 9 corresponds to Gaussian de-noising with noise level $$\sqrt{\frac{\lambda}{\mu}}$$

and regularization of $\phi(\cdot)$; in other words, plug-and-play CNN-based denoising solutions can be configured to handle EQN. 9. Additionally, EQN. 10 can be computed in its closed-form expression without a point-wise evaluation of H; this is given by:

$$z_{k+1} = \frac{y \uparrow_s + \sigma^2\rho(Hx_{k+1} + u_k)}{\sigma^2\rho + \delta_{i=0[s]}\delta_{j=0[s]}} \qquad \text{EQN. 12}$$

where $(\cdot) \uparrow_s$ corresponds to a 0 padding up-sampling with scale factor s, and $\delta_{i=0\ [s]}\delta_{j=0[s]}$ is the indicator function that is equal to 1 for pixels that are divided by the scale factor s, and 0 otherwise (illustrated as the up-sampling/down-sampling operators of FIG. 5).

An exhaustive derivation of the equations used throughout is provided in APPENDIX A, which is incorporated herein by reference in its entirety.

In view of the foregoing derivations, the exemplary CNN of FIG. 4 is subdivided into three (3) logical functions. These directly correspond to EQN. 9-11; specifically, the first task refers to a "prior step" ($\mathcal{P}$) that corresponds to EQN. 9. The second task refers to a "data term" ($\mathcal{D}$) that corresponds to EQN. 10. The third task refers to an "update block" ($\mathcal{U}$) that corresponds to EQN. 11. In a brute force implementation, these functions ($\mathcal{P}$, $\mathcal{D}$, $\mathcal{U}$) would be internalized as one specialized/open-form function that the CNN handles with node complexity/numerosity (e.g., FIG. 1). In contrast, the exemplary CNN has "unfolded" the problem into three approximations/closed-form functions that can be iterated through with generic plug-and-play CNN logic. Unfolding in this manner greatly reduces computational complexity, which allows for much smaller neural network implementations. Additionally, each step can be optimized with its own step-specific hyper parameters ($\lambda$, $\mu$, $\rho$) to improve performance.

In one exemplary embodiment, the "prior step" ($\mathcal{P}$) blocks perform the functional approximation of Gaussian denoising, within plug-and-play CNN denoising. In one specific variant, the plug-and-play CNN uses a ResUNet architecture with the denoising level as an extra input for the prior step $\mathcal{P}$. All the parameters of the ResUnet may be learned during the training process. In one such implementation, the plug-and-play algorithm uses MMSE denoising. Compared to conventional plug-and-play algorithms, the number of iterations can be fixed and very small. Retraining the parameters of the network improves the quality of results for a given number of iterations. The x-update of the CNN denoiser may be simplified as:

$$x_{k+1} = \mathcal{P}_{\beta_k}(x_k - \gamma_k H^T(H_{x_k} - z_k + u_k)) \qquad \text{EQN. 13:}$$

Where $$\beta_k = \sqrt{\frac{\lambda_k}{\mu_k}}$$

and $\gamma_k = \mu_k \rho_k$. The splitting algorithm also introduces the quantity: $x_k - \gamma_k H^T (H_{x_k} - z_k + u_k)$ which may be interpreted as the deblurring gradient descent step on the clean estimate $x_k$. The x-update combines deblurring and denoising.

In one exemplary embodiment, the "data term" ($\mathcal{D}$) computes the proximal operator of $$\frac{1}{2\sigma^2} \|z \downarrow_s - y\|_2^2,$$

and can be re-written as:

$$z_{k+1} = \mathcal{D}(H_{x_k+1} + u_k, y, s, \alpha_k) \text{ where } \alpha_k = \sigma^2 \mu_k \qquad \text{EQN. 14}$$

The data-term module ensures that the current estimate of the super resolution image is consistent with the blurred input. The data-term module also injects the degraded image y through the iterations.

In one exemplary embodiment, the "update block" ($\mathcal{U}$) computes the update on the residual for the ADMM algorithm. This block does not have trainable parameters, but is integrated to be consistent with linearized ADMM formulation; alternative implementations may handle this elsewhere.

In one specific implementation, each of the hyper parameters of the plug-and-play CNN are predicted by a neural network $\mathcal{H}(\sigma, s)$. The different hyper parameters of the model are $\alpha_k$, $\beta_k$, and $\rho_k$. In one specific implementation, $\alpha_k$ depends on the noise level in the image ($\sigma^2$), and the ADMM penalty parameter ($\mu_k$). In one such implementation, $\beta_k$ depends on the regularization parameter ($\lambda$) of the MAP estimator and the ADMM penalty parameter ($\mu_k$). In some cases, $\gamma_k$ may also depend on the ADMM penalty parameter ($\mu_k$) and $\rho_k$. Simple implementations may only predict $\mu_k$ and $\rho_k$; however, predicting $\lambda$ on a step-by-step basis may also improve flexibility. In one such implementation, the hyper parameters module may take the scale factor and the noise level as input.

In one exemplary embodiment, the $\mathcal{H}(\sigma, s)$ block can use a 3-layer linear neural network with rectified linear unit (ReLU) activation. In one such implementation, only 64 hidden layers are used.

Prior to operation, the exemplary CNN of FIG. 4 may be trained end-to-end using the L1 loss for 200 epochs. Initially, the CNN starts with a learning rate of $1 \times 10^{-4}$; this may be decreased every 50 epochs by a scale of 0.1. Empirical evidence suggests that using a pre-trained model for the ResUNet denoiser improved stability during the training—some implementations may use a ResUNet that was trained on minimum mean-square estimation (MMSE) gaussian denoising as a starting point. During training, the network may be trained using a scale factor (s) varying between 1, 2, 3, 4, and/or spatially varying blur kernels composed of motion blurs and Gaussian blurs and different noise levels between 0 and 25.

Exemplary Super-Resolution Device

Figure 6:
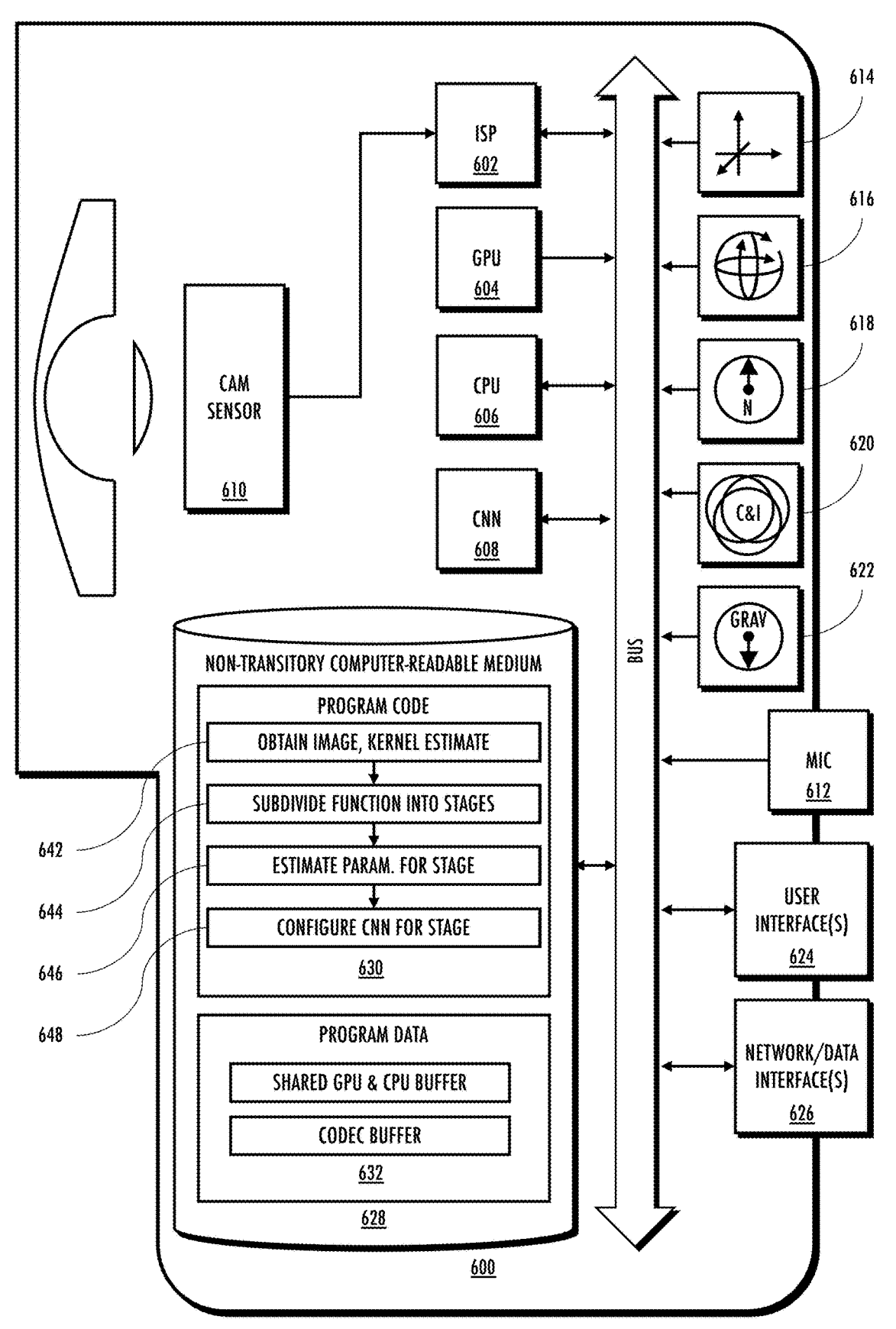
FIG. 6 is a logical block diagram of an exemplary super-resolution device, in accordance with various aspects of the present disclosure.

FIG. 6 is a logical block diagram of the exemplary device 600 configured to perform super-resolution processing. As shown, the exemplary device 600 includes: a sensor subsystem, a user interface subsystem, a communication subsystem, a control and data subsystem, and a bus to enable data transfer. The following discussion provides a specific discussion of the internal operations, design considerations, and/or alternatives, for each subsystem of the exemplary device 600. While the illustrated example is presented in the context of an image capture device (e.g., an action camera), other post-processing implementations may be substituted with equal success (e.g., smart phone, laptop, workstation, or other processing device).

Functionally, the device 600 captures and/or processes images. In one aspect, the device 600 uses a trained neural network model to perform super-resolution/upscaling of captured images/video with non-uniform spatial blur. In an image capture variant (e.g., an action camera), the device 600 performs the foregoing tasks according to real-time (or near real-time) processing budgets to e.g., work within a fixed set of resources. In post-processing variants (e.g., smart phone, laptop, workstation, or other processing device), the device 600 performs the foregoing tasks according to best-effort processing budgets to e.g., maximize image quality. In some cases, the device 600 may obtain the neural network models at manufacture or later via updates (e.g., firmware updates). In other cases, the device 600 may train neural network models for super-resolution of non-uniform blurring based on libraries or live data.

The techniques described throughout may be broadly applicable to image capture devices such as cameras including action cameras, digital cameras, digital video cameras; cellular phones; laptops; smart watches; and/or IoT devices. For example, a smart phone or laptop may be able to capture and process video. In another example, the techniques described throughout may be performed by a post-processing device or other device that did not capture the image/video data. Various other applications may be substituted with equal success by artisans of ordinary skill, given the contents of the present disclosure.

While the following discussion is presented in the context of a single device 600, artisans of ordinary skill in the related arts will readily appreciate that the techniques may be broadly extended to multiple device topologies and/or systems. For example, an image capture device may receive a neural network model from another device for processing image (and other) data, in other examples an image capture device may generate, train, and/or update the neural network model on the image capture device. Post-processing using the neural network model may be performed on the device that captured the data or may be performed or processed on a different device.

The following discussion provides functional descriptions for each of the logical entities of the exemplary device 600. Artisans of ordinary skill in the related art will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary device 600 is separately provided below.

As used herein, the term "real-time" refers to tasks that must be performed within definitive constraints; for example, a video camera must capture each frame of video at a specific rate of capture (e.g., 30 frames per second (fps)). As used herein, the term "near real-time" refers to tasks that must be performed within definitive time constraints once started; for example, a smart phone may use near real-time rendering for each frame of video at its specific rate of display, however some queueing time may be allotted prior to display.

Unlike real-time tasks, so-called "best-effort" refers to tasks that can be handled with variable bit rates and/or latency. Best-effort tasks are generally not time sensitive and can be run as low-priority background tasks (for even very high complexity tasks), or queued for cloud-based processing, etc.

Functional Overview of the Sensor Subsystem

Functionally, the sensor subsystem senses the physical environment and captures and/or records the sensed environment as data. In some embodiments, the sensor data may be stored as a function of capture time (so-called "tracks"). Tracks may be synchronous (aligned) or asynchronous (non-aligned) to one another. In some embodiments, the sensor data may be compressed, encoded, and/or encrypted as a data structure (e.g., MPEG, WAV, etc.)

The illustrated sensor subsystem includes: a camera sensor 610, a microphone 612, an accelerometer (ACCL 614), a gyroscope (GYRO 616), and a magnetometer (MAGN 618).

Other sensor subsystem implementations may multiply, combine, further sub-divide, augment, and/or subsume the foregoing functionalities within these or other subsystems. For example, two or more cameras may be used to capture panoramic (e.g., wide or 360°) or stereoscopic content. Similarly, two or more microphones may be used to record stereo sound.

In some embodiments, the sensor subsystem is an integral part of the device 600. In other embodiments, the sensor subsystem may be augmented by external devices and/or removably attached components (e.g., hot-shoe/cold-shoe attachments, etc.). The following sections provide detailed descriptions of the individual components of the sensor subsystem.

Camera Implementations and Design Considerations

In one exemplary embodiment, a camera lens bends (distorts) light to focus on the camera sensor 610. In one specific implementation, the optical nature of the camera lens is mathematically described with a lens polynomial. More generally however, any characterization of the camera lens' optical properties may be substituted with equal success; such characterizations may include without limitation:

polynomial, trigonometric, logarithmic, look-up-table, and/or piecewise or hybridized functions thereof. In one variant, the camera lens provides a wide field-of-view greater than 90°; examples of such lenses may include e.g., panoramic lenses 120° and/or hyper-hemispherical lenses 180°.

In one specific implementation, the camera sensor 610 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image.

More generally however, the various techniques described herein may be broadly applied to any camera assembly; including e.g., narrow field-of-view (30° to 90°) and/or stitched variants (e.g., 360° panoramas). While the foregoing techniques are described in the context of perceptible light, the techniques may be applied to other electromagnetic (EM) radiation capture and focus apparatus including without limitation: infrared, ultraviolet, and/or X-ray, etc.

As a brief aside, "exposure" is based on three parameters: aperture, ISO (sensor gain) and shutter speed (exposure time). Exposure determines how light or dark an image will appear when it's been captured by the camera(s). During normal operation, a digital camera may automatically adjust one or more settings including aperture, ISO, and shutter speed to control the amount of light that is received. Most action cameras are fixed aperture cameras due to form factor limitations and their most common use cases (varied lighting conditions)—fixed aperture cameras only adjust ISO and shutter speed. Traditional digital photography allows a user to set fixed values and/or ranges to achieve desirable aesthetic effects (e.g., shot placement, blur, depth of field, noise, etc.).

The term "shutter speed" refers to the amount of time that light is captured. Historically, a mechanical "shutter" was used to expose film to light; the term shutter is still used, even in digital cameras that lack of such mechanisms. For example, some digital cameras use an electronic rolling shutter (ERS) that exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time, but they are not erased/read at the same time since the pointers scan through the rows. A faster shutter speed has a shorter capture time, a slower shutter speed has a longer capture time.

A related term, "shutter angle" describes the shutter speed relative to the frame rate of a video. A shutter angle of 360° means all the motion from one video frame to the next is captured, e.g., video with 24 frames per second (FPS) using a 360° shutter angle will expose the photosensitive sensor for $\frac{1}{24}^{th}$ of a second. Similarly, 120 FPS using a 360° shutter angle exposes the photosensitive sensor $\frac{1}{120}$th of a second. In low light, the camera will typically expose longer, increasing the shutter angle, resulting in more motion blur. Larger shutter angles result in softer and more fluid motion, since the end of blur in one frame extends closer to the start of blur in the next frame. Smaller shutter angles appear stuttered and disjointed since the blur gap increases between the discrete frames of the video. In some cases, smaller shutter angles may be desirable for capturing crisp details in each frame. For example, the most common setting for cinema has been a shutter angle near 180°, which equates to a shutter speed near $\frac{1}{48}^{th}$ of a second at 24 FPS. Some users may use other shutter angles that mimic old 1950's newsreels (shorter than 180°).

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning". Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

Microphone Implementations and Design Considerations

In one specific implementation, the microphone 612 senses acoustic vibrations and converts the vibrations to an electrical signal (via a transducer, condenser, etc.). The electrical signal may be further transformed to frequency domain information. The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.).

More generally however, the various techniques described herein may be broadly applied to any integrated or handheld microphone or set of microphones including, e.g., boom and/or shotgun-style microphones. While the foregoing techniques are described in the context of a single microphone, multiple microphones may be used to collect stereo sound and/or enable audio processing. For example, any number of individual microphones can be used to constructively and/or destructively combine acoustic waves (also referred to as beamforming).

Inertial Measurement Unit (IMU) Implementations and Design Considerations

The inertial measurement unit (IMU) includes one or more accelerometers, gyroscopes, and/or magnetometers. In one specific implementation, the accelerometer (ACCL 614) measures acceleration and gyroscope (GYRO 616) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 620). In one specific implementation, the magnetometer (MAGN 618) may provide a magnetic north vector (which may be used to "north lock" video and/or augment location services such as GPS), similarly the accelerometer (ACCL 614) may also be used to calculate a gravity vector (GRAV 622).

Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both device direction and speed).

More generally, however, any scheme for detecting device velocity (direction and speed) may be substituted with equal success for any of the foregoing tasks. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Functional Overview of the User Interface Subsystem

Functionally, the user interface subsystem 624 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 624 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Other user interface subsystem 624 implementations may multiply, combine, further sub-divide, augment, and/or subsume the foregoing functionalities within these or other subsystems. For example, the audio input may incorporate elements of the microphone (discussed above with respect to the sensor subsystem). Similarly, IMU based input may incorporate the aforementioned IMU to measure "shakes", "bumps" and other gestures.

In some embodiments, the user interface subsystem 624 is an integral part of the device 600. In other embodiments, the user interface subsystem may be augmented by external devices (such as another post-processing device, etc.) and/or removably attached components (e.g., hot-shoe/cold-shoe attachments, etc.). The following sections provide detailed descriptions of the individual components of the sensor subsystem.

Touchscreen and Buttons Implementation and Design Considerations

In some embodiments, the user interface subsystem 624 may include a touchscreen panel. A touchscreen is an assembly of a touch-sensitive panel that has been overlaid on a visual display. Typical displays are liquid crystal displays (LCD), organic light emitting diodes (OLED), and/or active-matrix OLED (AMOLED). Touchscreens are commonly used to enable a user to interact with a dynamic display, this provides both flexibility and intuitive user interfaces. Within the context of action cameras, touchscreen displays are especially useful because they can be sealed (waterproof, dust-proof, shock-proof, etc.).

Most commodity touchscreen displays are either resistive or capacitive. Generally, these systems use changes in resistance and/or capacitance to sense the location of human finger(s) or other touch input. Other touchscreen technologies may include, e.g., surface acoustic wave, surface capacitance, projected capacitance, mutual capacitance, and/or self-capacitance. Yet other analogous technologies may include, e.g., projected screens with optical imaging and/or computer-vision.

In some embodiments, the user interface subsystem 624 may also include mechanical buttons, keyboards, switches, scroll wheels and/or other mechanical input devices. Mechanical user interfaces are usually used to open or close a mechanical switch, resulting in a differentiable electrical signal. While physical buttons may be more difficult to seal against the elements, they are nonetheless useful in low-power applications since they do not require an active electrical current draw. For example, many Bluetooth Low Energy (BLE) applications may be triggered by a physical button press to further reduce graphical user interface (GUI) power requirements.

More generally, however, any scheme for detecting user input may be substituted with equal success for any of the foregoing tasks. While the foregoing techniques are described in the context of a touchscreen and physical buttons that enable user data entry, artisans of ordinary skill in the related arts will readily appreciate that any of their derivatives may be substituted with equal success.

Microphone/Speaker Implementation and Design Considerations

Audio input may incorporate a microphone and codec with a speaker. As previously noted, the microphone can capture and convert audio for voice commands. For audible feedback, the audio codec may obtain audio data and decode the data into an electrical signal. The electrical signal can be amplified and used to drive the speaker to generate acoustic waves.

As previously noted, the microphone and speaker may have any number of microphones and/or speakers for beamforming. For example, two speakers may be used to provide stereo sound. Multiple microphones may be used to collect both the user's vocal instructions as well as the environmental sounds.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

The illustrated network/data interface 626 may include network interfaces including, but not limited to: Wi-Fi, Bluetooth, Global Positioning System (GPS), USB, and/or Ethernet network interfaces. Additionally, the network/data interface 626 may include data interfaces such as: SD cards (and their derivatives) and/or any other optical/electrical/magnetic media (e.g., MMC cards, CDs, DVDs, tape, etc.).

Network Interface Implementation and Design Considerations

The communication subsystem including the network/data interface 626 of the device 600 may include one or more radios and/or modems. As used herein, the term "modem" refers to a modulator-demodulator for converting computer data (digital) into a waveform (baseband analog). The term "radio" refers to the front-end portion of the modem that upconverts and/or downconverts the baseband analog waveform to/from the RF carrier frequency.

As previously noted, communication subsystem with network/data interface 626 may include wireless subsystems (e.g., $5^{th}/6^{th}$/Generation (5G/6G) cellular networks, Wi-Fi, Bluetooth (including, Bluetooth Low Energy (BLE) communication networks), etc.). Furthermore, the techniques described throughout may be applied with equal success to wired networking devices. Examples of wired communications include without limitation Ethernet, USB, PCI-e. Additionally, some applications may operate within mixed environments and/or tasks. In such situations, the multiple different connections may be provided via multiple different communication protocols. Still other network connectivity solutions may be substituted with equal success.

More generally, any scheme for transmitting data over transitory media may be substituted with equal success for any of the foregoing tasks.

Data Interface Implementation and Design Considerations

The communication subsystem of the device 600 may include one or more data interfaces for removeable media. In one exemplary embodiment, the device 600 may read and write from a Secure Digital (SD) card or similar card memory.

While the foregoing discussion is presented in the context of SD cards, artisans of ordinary skill in the related arts will readily appreciate that other removeable media may be substituted with equal success (flash drives, MMC cards, etc.). Furthermore, the techniques described throughout may be applied with equal success to optical media (e.g., DVD, CD-ROM, etc.).

More generally, any scheme for storing data to non-transitory media may be substituted with equal success for any of the foregoing tasks.

Functional Overview of the Control and Data Processing Subsystem

Functionally, the control and data processing subsystems are used to read/write and store data to effectuate calculations and/or actuation of the sensor subsystem, user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 6, the control and data subsystem may include one or more of: a central processing unit (CPU 606), an image signal processor (ISP 602), a graphics processing unit (GPU 604), a plug-and-play convolutional neural network (CNN) 608, and a non-transitory computer-readable medium 628 that stores program instructions and/or data.
Processor-Memory Implementations and Design Considerations As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU (such as shown in FIG. 6) may be primarily used to control device operation and/or perform tasks of arbitrary complexity/best-effort. CPU operations may include, without limitation: general-purpose operating system (OS) functionality (power management, UX), memory management, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or auto exposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization. In many cases, the ISP may locally execute its own real-time operating system (RTOS) to schedule tasks of according to real-time constraints.

Much like the ISP, the GPU is primarily used to modify image data and may be heavily pipelined (seldom branches) and may incorporate specialized vector-matrix logic. Unlike the ISP however, the GPU often performs image processing acceleration for the CPU, thus the GPU may need to operate on multiple images at a time and/or other image processing tasks of arbitrary complexity. In many cases, GPU tasks may be parallelized and/or constrained by real-time budgets. GPU operations may include, without limitation: stabilization, lens corrections (stitching, warping, stretching), image corrections (shading, blending), noise reduction (filtering, etc.). GPUs may have much larger addressable space that can access both local cache memory and/or pages of system virtual memory. Additionally, a GPU may include multiple parallel cores and load balancing logic to e.g., manage power consumption and/or performance. In some cases, the GPU may locally execute its own operating system to schedule tasks according to its own scheduling constraints (pipelining, etc.).

A hardware codec converts image data to an encoded data for transfer and/or converts encoded data to image data for playback. Much like ISPs, hardware codecs are often designed according to specific use cases and heavily commoditized. Typical hardware codecs are heavily pipelined, may incorporate discrete cosine transform (DCT) logic (which is used by most compression standards), and often have large internal memories to hold multiple frames of video for motion estimation (spatial and/or temporal). As with ISPs, codecs are often bottlenecked by network connectivity and/or processor bandwidth, thus codecs are seldom parallelized and may have specialized data structures (e.g., registers that are a multiple of an image row width, etc.). In some cases, the codec may locally execute its own operating system to schedule tasks according to its own scheduling constraints (bandwidth, real-time frame rates, etc.).

Other processor subsystem implementations may multiply, combine, further sub-divide, augment, and/or subsume the foregoing functionalities within these or other processing elements. For example, multiple ISPs may be used to service multiple camera sensors. Similarly, CNN functionality (described below) may be subsumed with either GPU or CPU operation via software emulation.
Neural Network Implementations and Design Considerations Unlike traditional "Turing"-based processor architectures (discussed above), neural network processing emulates a network of connected nodes (also known as "neurons") that loosely model the neuro-biological functionality found in the human brain. While neural network computing is still in its infancy, such technologies already have great promise for e.g., compute rich, low power, and/or continuous processing applications.

Each processor node of the neural network is a computation unit that may have any number of weighted input connections, and any number of weighted output connections. The inputs are combined according to a transfer function to generate the outputs. In one specific embodiment, each processor node of the neural network combines its inputs with a set of coefficients (weights) that amplify or dampen the constituent components of its input data. The input-weight products are summed and then the sum is passed through a node's activation function, to determine the size and magnitude of the output data. "Activated" neurons (processor nodes) generate output data. The output data may be fed to another neuron (processor node) or result in an action on the environment. Coefficients may be iteratively updated with feedback to amplify inputs that are beneficial, while dampening the inputs that are not.

Many neural network processors emulate the individual neural network nodes as software threads, and large vector-matrix multiply accumulates. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Unlike the Turing-based processor architectures, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training may occur "offline" with batches of prepared data or "online" with live data using system pre-processing. Many implementations combine offline and online training to e.g., provide accurate initial performance that adjusts to system-specific considerations over time.

In one exemplary embodiment, a neural network processor (NPU) such as the plug-and-play convolutional neural network (CNN) 608 may be trained to process captured image data to generate super resolution images. Convolutional neural networks are a specialized type of artificial neural network that use a mathematical operation called convolution in place of general matrix multiplication in at least one of their layers. CNNs are frequently applied to analyze visual imagery.

Each neuron in a neural network computes an output value by applying a specific function to the input values received from the receptive field in the previous layer. The function that is applied to the input values is determined by a vector of weights and a bias. Training consists of iteratively adjusting these biases and weights. The vectors of weights and biases are called filters and represent particular features of the input (e.g., a particular shape). CNNs may be trained to learn to optimize filters (or kernels) through automated training, whereas in traditional algorithms these filters are hand-engineered. In some exemplary CNNs, many neurons can share the same filter. This reduces the memory footprint because a single bias and a single vector of weights are used across all receptive fields that share that filter, as opposed to each receptive field having its own bias and vector weighting.

Once the NPU has "learned" appropriate behavior, the NPU may be used in real-world scenarios. NPU-based solutions are often more resilient to variations in environment and may behave reasonably even in unexpected circumstances (e.g., similar to a human).

Generalized Operation of the Control and Data Processing Subsystem

In one embodiment, the memory subsystem may be used to store data locally at the device 600. In one exemplary embodiment, data may be stored as non-transitory symbols (e.g., bits read from non-transitory computer-readable mediums). In one specific implementation, the memory subsystem including non-transitory computer-readable medium 628 is physically realized as one or more physical memory chips (e.g., NAND/NOR flash) that are logically separated into memory data structures. The memory subsystem may be bifurcated into program code 630 and/or program data 632. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In some embodiments, the program code may be statically stored within the device 600 as firmware. In other embodiments, the program code may be dynamically stored (and changeable) via software updates. In some such variants, software may be subsequently updated by external parties and/or the user, based on various access permissions and procedures.

In one embodiment, the non-transitory computer-readable medium includes a routine that performs super-resolution of images with non-uniform spatial blur. This routine may enable detail to be recovered from images or image segments. When executed by the control and data subsystem, the routine causes the device 600 to: obtain images and/or estimate blur kernels; subdivide a function into stages, estimate parameters for each stage, and iteratively configure the convolutional neural network for each stage. Additional routines may include training routines for the CNN 608 to improve a neural network model.

At step 642, the control and data subsystem obtains an image. In one exemplary embodiment, the image may be captured by a camera of the sensor subsystem. In some implementations, the image may be part of an ongoing video capture. Ongoing video captures may occur under real-time or near-real-time constraints. In other implementations, the image may be obtained from previously captured footage or generated images. For example, a user may have previously captured footage on an action camera, and moved the footage to their smart phone, laptop, or workstation for "post-processing" after capture. More generally, media data may be e.g., captured from sensors, received from another device, retrieved from storage, generated from models or libraries, or otherwise obtained.

In some variants, the control and data subsystem may obtain an estimate of the blur kernel. In some cases, the blur kernel may be based on a pre-processing step. For example, object motion (in addition to lighting and exposure settings) may be used to infer the presence of motion blur. Thus, blur kernels may be estimated based on pixel motion and/or camera motion derived during image signal processing. Other schemes may perform object detection and/or motion estimation using IMU data and/or camera sensor information (e.g., ISO, shutter speed, etc.). Still other implementations may attempt to model (rather than measure) blur components. For example, neural network processing may be used to estimate a blur kernel based on object recognition and/or training libraries. More generally, any number of blur masks may be summed to generate non-uniform spatially varying kernels (such as was discussed above with reference to EQN. 4.

At step 644, the control and data subsystem subdivides a function into multiple stages. In one embodiment, the function comprises a super-resolution function which is divided into a "prior stage" (see e.g., EQN. 9), a "data stage" (see e.g., EQN. 10), and an "update stage" (see e.g., EQN. 11). The prior stage denoises blurred images according to a particular blur kernel. The data stage ensures that the denoised image remains consistent with the blurred input (e.g., that a blurred version of the resolved image matches the original blurred image). In other words, the prior stage and the data stage ensure that the noise removed during denoising remains consistent with the noise of the blurred image. The update stage allows for iterative optimization of the parameters for the prior and data stages; in other words, the update stage allows for optimization over multiple iterations.

More generally, however, the various subdivisions may be modified for any number of different applications. For example, instead of using a plug-and-play CNN denoiser trained on Gaussian noise, the subdivision may use colored denoising to amplify/attenuate certain frequencies of noise. Similarly, the data stage may modify the nature of its proximal operator (e.g., error relative to the original signal) in order to denoise more or less aggressively. Still other implementations may use multiple distinct levels of denoising and/or data stages.

While the foregoing example is presented in the context of three stages (corresponding to a linearized alternating direction method of multipliers (linearized ADMM)) artisans of ordinary skill in the related arts will readily appreciate that a greater or fewer number of stages may be substituted with equal success. More directly, subdividing a function into smaller sub-tasks may allow for reduced processing complexity which corresponds to smaller neural networks (node counts) and/or reduced iterations. This may be particularly important for embedded devices and/or real-time processing constraints. Larger sub-tasks are more complex and may result in better performance over a range of outcomes, with increased complexity.

While the foregoing examples are presented in the context of super-resolution, artisans of ordinary skill in the related arts will readily appreciate that the techniques described throughout are broadly applicable to oversampling and/or post-processing techniques. More directly, the techniques described herein may be broadly extended to interpolation, extrapolation, artifact insertion/removal, noise insertion/removal, and/or any other form of post-processing manipulation.

At step 646, the control and data subsystem estimate parameter(s) for the stages and the control and data subsystem configures a convolutional neural network to perform stages of the function (step 648). As previously noted, the foregoing techniques are performed over a number of iterations. Selectively updating hyper parameters across iterations seeks to improve performance over time. The simplified linearized ADMM techniques described throughout enable operation on devices with limited capabilities and/or time budgets. More directly, the smaller subtasks can be completed quickly with smaller neural networks and/or faster processing times. Potentially, these benefits may enable operation on capture devices (e.g., during an ongoing media capture of an action camera) or other embedded devices of the mobile ecosystem (e.g., smart phones, etc.). In other words, artisans of ordinary skill in the related arts will readily appreciate that other divisions may be useful to adjust the size of neural network models and/or the number of iterations necessary to achieve suitable results.

While the foregoing techniques are presented in the context of a convolutional neural network, other neural networks may be substituted with equal success. Examples may include without limitation recurrent neural networks (RNNs), feed-forward neural networks (FFNNs), and/or other convolutional neural networks (CNNs)—including non-plug-and-play variants.

While the foregoing discussion is presented within the context of post-processing an image to perform super-resolution of images with non-uniform spatial blur, the discussed operations may be performed with equal success during the initial capture and processing of the image data as part of the image processing pipeline or in other use cases may be substituted with equal success.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C #/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method, comprising:
obtaining an image and a blurred version;
iteratively performing a super-resolution function based on a deconvolution of a non-uniform spatial blur on the image over a plurality of iterations, the super-resolution function comprising at least a prior stage of a linearized alternating direction method of multipliers (ADMM), a data stage of the linearized ADMM, and an update stage of the linearized ADMM, where:
during the prior stage, configuring a convolutional neural network processor to denoise the blurred version into a denoised version based on a regularization parameter;
during the data stage, configuring the convolutional neural network processor to compute a proximal operator of the blurred version and the denoised version based on a penalty parameter; and
during the update stage, calculating an update parameter used to configure the convolutional neural network processor for a next iteration of the prior stage and the data stage based on the denoised version and the proximal operator; and outputting a super-resolution image.

2. The method of claim 1, where the convolutional neural network processor comprises a plug-and-play Gaussian denoiser.

3. The method of claim 2, where the plug-and-play Gaussian denoiser is trained on minimum mean-square estimation.

4. The method of claim 1, where the prior stage, the data stage, and the update stage are performed for a fixed number of iterations.

5. The method of claim 1, where the regularization parameter is estimated based on a regularization of a maximum a-posteriori estimator by a second neural network, and the penalty parameter is estimated by the second neural network.

6. The method of claim 5, where during the data stage, configuring the convolutional neural network processor based on a parameter based on the penalty parameter and a noise level of the blurred version.

7. The method of claim 5, where the regularization parameter and the penalty parameter are each estimated by the second neural network at each iteration of the plurality of iterations.

8. An apparatus, comprising:
a processor;
a convolutional neural network; and
a non-transitory computer-readable medium comprising instructions that when executed by the processor, causes the processor to:
obtain an image; and
iteratively resolve the image with the convolutional neural network over a plurality of iterations according to a super-resolution function, where each iteration of the plurality of iterations comprises a prior stage of a linearized alternating direction method of multipliers (ADMM), a data stage of the linearized ADMM, and an update stage of the linearized ADMM.

9. The apparatus of claim 8, further comprising a camera sensor, where the image is obtained from the camera sensor, and where the super-resolution function is performed according to a real-time constraint.

10. The apparatus of claim 9, where the image is obtained from an ongoing video capture.

11. The apparatus of claim 8, further comprising a data interface, where the image is obtained from the data interface, and where the super-resolution function is performed after image capture.

12. The apparatus of claim 11, where the convolutional neural network comprises a plug-and-play Gaussian denoiser.

13. The apparatus of claim 12, where the plug-and-play Gaussian denoiser is trained on minimum mean-square estimation.

14. The apparatus of claim 8, where the image is iteratively resolved in a fixed number of iterations.

15. A non-transitory computer-readable medium comprising one or more instructions which, when executed by a processor, causes the processor to configure a convolutional neural network to iteratively:

denoise a blurred version of an image into a denoised version during a prior stage of a linearized alternating direction method of multipliers (ADMM);

compute a proximal operator of the image and the denoised version during a data stage of the linearized ADMM; and update an update parameter used to configure the convolutional neural network for a next iteration of the prior stage and the data stage based on the denoised version and the proximal operator during an update stage of the linearized ADMM.

16. The non-transitory computer-readable medium of claim 15, where the blurred version comprises a linearly up-sampled version of the image.

17. The non-transitory computer-readable medium of claim 15, where:

denoising the blurred version of the image is based on a regularization parameter, the regularization parameter is estimated based on a regularization of a maximum a-posteriori estimator by a second neural network, computing the proximal operator is based on a penalty parameter, and the penalty parameter is estimated based on a noise level of the blurred version by the second neural network.

18. The non-transitory computer-readable medium of claim 15, where the convolutional neural network comprises a plug-and-play Gaussian denoiser.

19. The non-transitory computer-readable medium of claim 18, where the plug-and-play Gaussian denoiser is trained on minimum mean-square estimation.

20. The non-transitory computer-readable medium of claim 15, where the convolutional neural network performs a super-resolution function over a fixed number of iterations.

* * * * *